(12) United States Patent
Wang et al.

(10) Patent No.: US 9,879,970 B2
(45) Date of Patent: Jan. 30, 2018

(54) METHOD FOR ESTIMATING CABLE LENGTH IN ETHERNET SYSTEM AND RECEIVER THEREOF

(71) Applicant: REALTEK SEMICONDUCTOR CORP., Hsinchu (TW)

(72) Inventors: Shih-Wei Wang, Hsinchu (TW); Liang-Wei Huang, Hsinchu (TW); Ching-Yao Su, Hsinchu (TW); Sheng-Fu Chuang, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 428 days.

(21) Appl. No.: 14/326,895

(22) Filed: Jul. 9, 2014

(65) Prior Publication Data

US 2015/0049620 A1 Feb. 19, 2015

(30) Foreign Application Priority Data

Aug. 14, 2013 (TW) .............................. 102129205 A

(51) Int. Cl.
*H04L 12/26* (2006.01)
*G01B 7/02* (2006.01)
*G06F 11/22* (2006.01)

(52) U.S. Cl.
CPC .............. *G01B 7/026* (2013.01); *G06F 11/22* (2013.01)

(58) Field of Classification Search
CPC . G01R 31/02; H03G 3/00; H03H 7/30; H03H 7/40; H03K 5/159; H04B 1/38; H04L 7/00; H04L 12/26; H04L 25/49; H04L 27/01; H04L 27/06; H04L 43/08

USPC ........ 324/535, 539, 543, 699; 370/241, 242, 370/252; 375/219, 222, 232, 233, 257, 375/350

See application file for complete search history.

(56) References Cited

U.S. PATENT DOCUMENTS

| | | | |
|---|---|---|---|
| 6,519,069 B1 | 2/2003 | Evans et al. | |
| 7,254,198 B1* | 8/2007 | Manickam | H04L 25/03057 375/233 |
| 7,502,951 B2 | 3/2009 | Sakurai et al. | |
| 7,977,951 B1* | 7/2011 | Lo | H04L 12/2697 324/534 |
| 8,416,699 B1* | 4/2013 | Lo | H04L 12/2697 324/532 |
| 8,514,916 B2* | 8/2013 | Bishop | H04L 25/24 340/12.37 |
| 2001/0036228 A1 | 11/2001 | Skafidas et al. | |

(Continued)

FOREIGN PATENT DOCUMENTS

| | | |
|---|---|---|
| TW | I220611 B | 8/2004 |
| TW | 201108675 A | 3/2011 |
| TW | 201308917 A | 2/2013 |

OTHER PUBLICATIONS

USPTO Office Action, U.S. Appl. No. 14/572,340, dated Apr. 20, 2015.

*Primary Examiner* — Shawkat M Ali
(74) *Attorney, Agent, or Firm* — Rabin & Berdo, P.C.

(57) ABSTRACT

A method for estimating cable length in an Ethernet system and a receiver thereof are applicable to an Ethernet system. The method for estimating cable length includes obtaining a channel tap from channel information of a feedback equalizer in the Ethernet system and estimating a cable length according to the channel tap, a first coefficient and a constant.

18 Claims, 5 Drawing Sheets

(56) References Cited

U.S. PATENT DOCUMENTS

| | | | |
|---|---|---|---|
| 2003/0026333 A1* | 2/2003 | Murray | H04L 25/03038 |
| | | | 375/229 |
| 2004/0234002 A1* | 11/2004 | Yang | H04L 5/12 |
| | | | 375/263 |
| 2005/0243681 A1 | 11/2005 | Yen | |
| 2007/0201583 A1* | 8/2007 | Yen | H04L 25/022 |
| | | | 375/340 |
| 2007/0230555 A1* | 10/2007 | Peleg | H04B 3/48 |
| | | | 375/232 |
| 2007/0258517 A1* | 11/2007 | Rollings | H04L 25/03057 |
| | | | 375/233 |
| 2010/0054315 A1 | 3/2010 | Huang et al. | |
| 2010/0098140 A1* | 4/2010 | Huang | H04B 3/32 |
| | | | 375/219 |
| 2010/0150264 A1* | 6/2010 | Taubin | H04L 25/497 |
| | | | 375/296 |
| 2010/0158096 A1* | 6/2010 | Yang | H04L 25/03057 |
| | | | 375/233 |
| 2011/0292974 A1 | 12/2011 | Lamba et al. | |
| 2014/0146867 A1* | 5/2014 | Shvydun | H04L 25/03885 |
| | | | 375/233 |
| 2015/0312056 A1* | 10/2015 | Zhang | H04L 25/0212 |
| | | | 375/233 |

* cited by examiner

METHOD FOR ESTIMATING CABLE LENGTH IN ETHERNET SYSTEM AND RECEIVER THEREOF

CROSS-REFERENCES TO RELATED APPLICATIONS

This non-provisional application claims priority under 35 U.S.C. §119(a) on Patent Application No. 102129205 filed in Taiwan, R.O.C. on 2013 Aug. 14, the entire contents of which are hereby incorporated by reference.

BACKGROUND

Technical Field

The present invention relates to a channel estimation technology, and more particularly, to a method for estimating cable length in an Ethernet system and a receiver thereof.

Related Art

In an Ethernet system, use of channels can be better detected and controlled if cable length information and cable status are provided. Therefore, a lot of manners for estimating a cable length have been proposed, for example, estimating a cable length by measuring energy of a received signal, or estimating a cable length by observing a relation between spectrum of a received signal and the cable length. Although many manners at present can be used to provide cable length information of an ultra-high-speed Ethernet system, these manners fail to have the following three elements at the same time, i.e., stability, simple calculation and high accuracy.

For example, the manner of estimating a cable length by measuring energy of a received signal is easily affected by different power of a transmitting end, and thus cannot maintain the same effect in various environments and cannot provide good stability.

The manner of estimating a cable length by observing a relation between spectrum of a received signal and the cable length uses a channel response ratio of 6 MHz to 43 MHz for cable length estimation. It is found according to a simulation result that the accuracy thereof is quite high, but the problem lies in that the actual hardware implementation requires too high cost. As calculation of DFT (Discrete Fourier Transform) of many points is required for accurate calculation of components of 6 MHz and 43 MHz, this involves a large number of multiplications and additions, so that the IC area becomes large and the cost increases, which is difficult to meet the actual demand.

SUMMARY

In an embodiment, a method for estimating cable length in an Ethernet system is applicable to an Ethernet system. The method for estimating cable length includes obtaining a channel tap from channel information of a feedback equalizer in the Ethernet system and estimating a cable length according to the channel tap, a first coefficient and a constant.

In an embodiment, an Ethernet system receiver includes: a front-end receiving device, a feed-forward equalizer, an adder, a feedback equalizer, and a channel estimator. The feed-forward equalizer is electrically connected to the front-end receiving device. The adder is electrically connected to the feed-forward equalizer. The feedback equalizer is electrically connected to the adder. The channel estimator is electrically connected to the feedback equalizer, and is used for estimating a cable length according to a channel tap of the feedback equalizer, a first coefficient and a constant.

In summary, the method for estimating cable length in an Ethernet system and the receiver thereof according to the present invention use information of a feedback equalizer (and a feed-forward equalizer) of the receiver in a connection state to obtain channel information corresponding to a channel response (and channel information corresponding to a sampling phase difference), and estimate a cable length accordingly, thereby accurately and easily obtaining cable length information.

DETAILED DESCRIPTION

Figure 1:
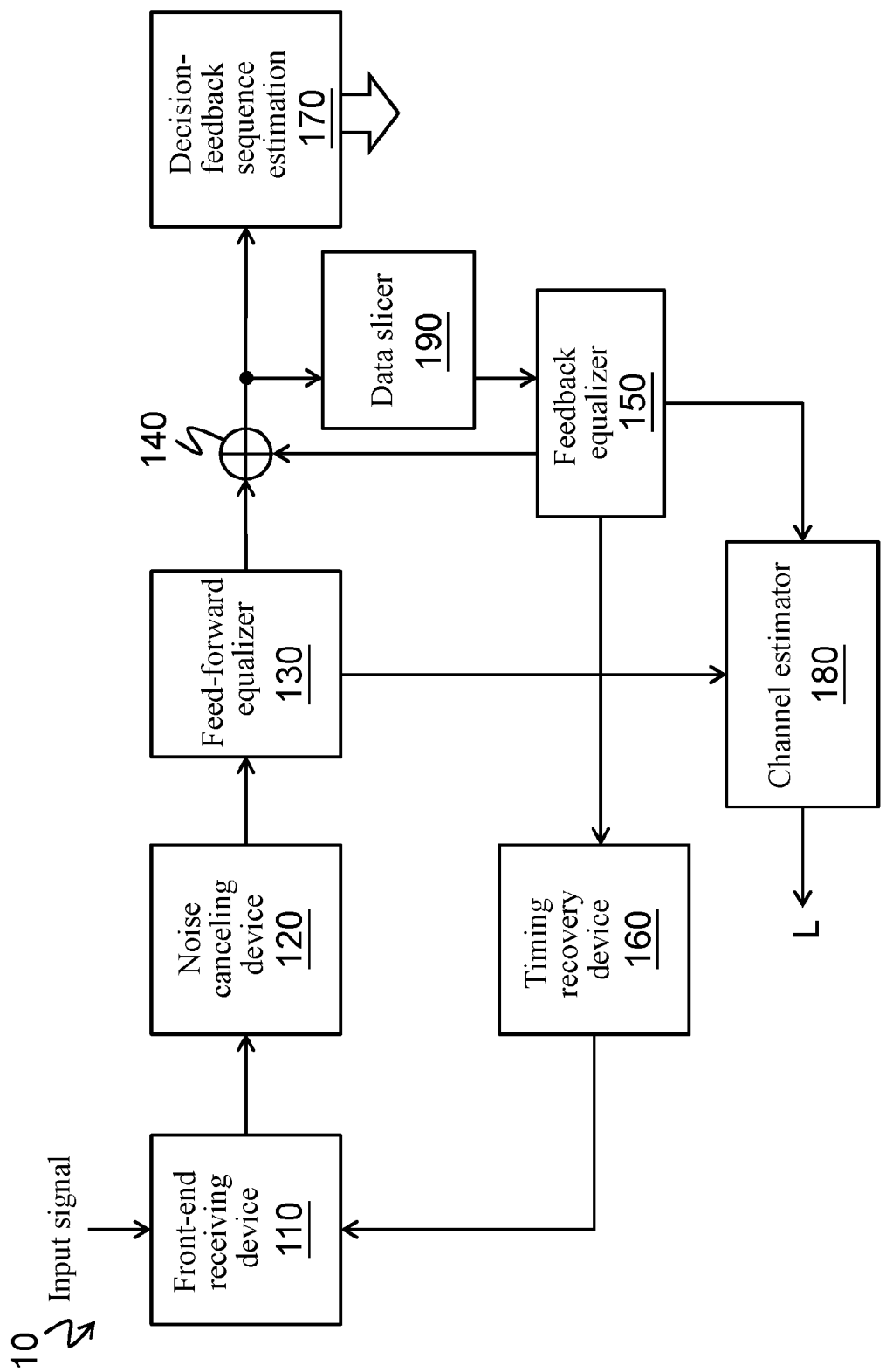
FIG. 1 is a schematic block diagram of an Ethernet system receiver according to an embodiment of the present invention.

Referring to FIG. 1, an Ethernet system receiver 10 includes a front-end receiving device 110, a noise canceling device 120, a feed-forward equalizer (FFE) 130, an adder 140, a feedback equalizer (FBE) 150, a timing recovery device 160, a decision-feedback sequence estimation (DFSE) 170, a channel estimator 180 and a data slicer 190.

The front-end receiving device 110, the noise canceling device 120, the FFE 130, the adder 140, and the DFSE 170 are electrically connected in sequence. The FBE 150 is electrically connected to the adder 140, and the timing recovery device 160 is electrically connected between the front-end receiving device 110 and the FBE 150. The channel estimator 180 is electrically connected to the FFE 130 and the FBE 150. Herein, two input ends of the adder 140 respectively are electrically connected to the FFE 130 and the FBE 150, and an output end of the adder 140 is electrically connected to the DFSE 170. The data slicer 190 is electrically connected between the output end of the adder 140 and the FBE 150.

The front-end receiving device 110 is used for receiving an input signal transmitted from a remote end and converting the signal into a digital signal. The noise canceling device 120 is used for canceling near-end interference in the signal. The FFE 130 is used for canceling precursor components of inter-symbol interference (ISI) in the signal. The adder 140 is used for canceling remote interference in the signal according to digital input signals, undergoing near-end interference cancellation, timing recovery and channel equalization, of other near-end receivers. The FBE 150 is used for canceling postcursor components of ISI. The timing recovery device 160 is used for perform signal timing recovery, so as to synchronize frequency and phase of a clock signal at a receiving end with frequency and phase of a clock signal at a transmitting end. The DFSE 170 is used for performing decoding and canceling postcursor components of ISI in the signal. The channel estimator 180 is used for estimating a channel length (i.e., cable length L of a cable) between master/slave sending and receiving devices, so as to preset parameters of elements such as the FFE 130, the FBE 150 and an analog auto-gain controller, thereby accelerating system convergence.

The front-end receiving device 110 may include an analog auto-gain controller, a low pass filter (LPF), a sample/hold circuit (S/H circuit), an inverse partial response (IPR) filter and an analog-to-digital converter (ADC). The noise canceling device 120 may include an echo canceller, a plurality of near-end crosstalk cancellers (NEXT cancellers) and an adder. The analog auto-gain controller, the LPF, the S/H circuit, the IPR filter, the ADC and an input end of the adder are electrically connected in sequence (in series). The echo canceller and the NEXT cancellers are electrically connected to the other input end of the adder. An output end of the adder is electrically connected to the FBE 150.

Figure 2:
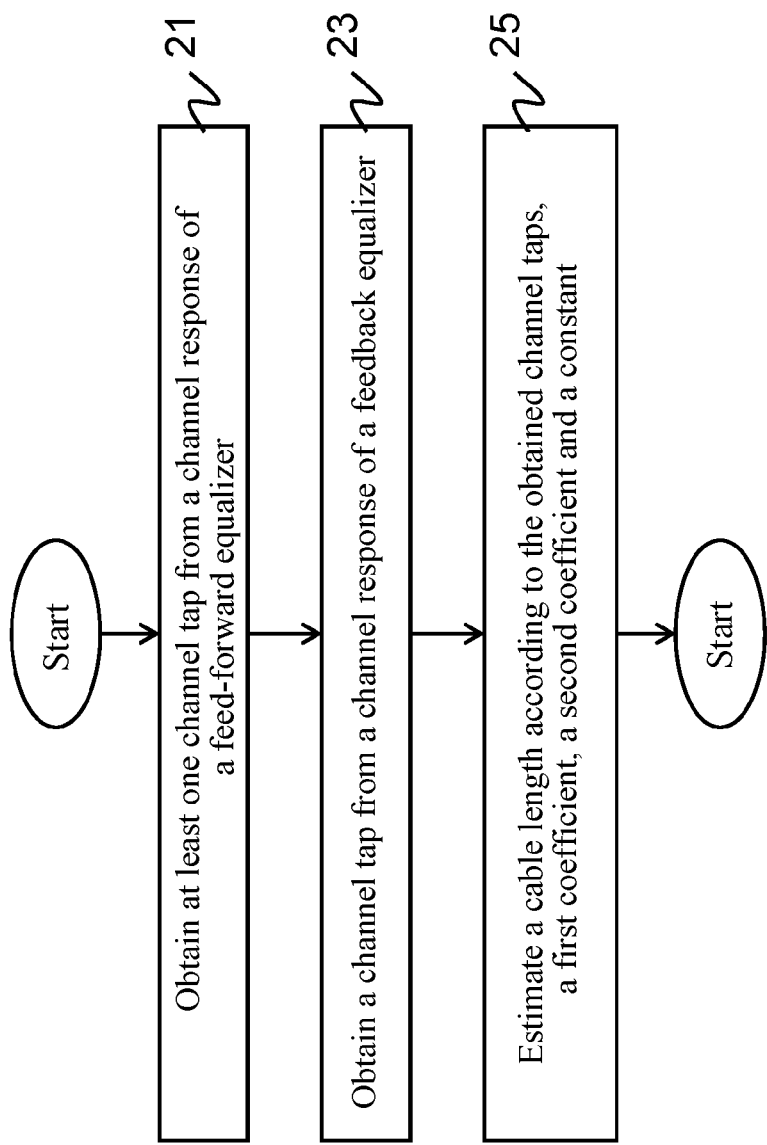
FIG. 2 is a schematic flow chart of a method for estimating cable length according to an embodiment of the present invention.

Referring to FIG. 2, the method for estimating cable length used by the channel estimator 180 includes obtaining a channel tap from channel information of the FFE 130 (Step S21), obtaining a channel tap from channel information of the FBE 150 (Step S23), and estimating a cable length L according to the obtained channel taps, a first coefficient (a), a second coefficient (k) and a constant (b) (Step S25).

In some embodiments, the channel estimator 180 estimates the cable length L according to the following formula 1:

$$L = \frac{1}{N}\sum_{i=1}^{N} a \times (cb0_i + cf5_i + k \times cf3_i) + b \quad \text{Formula 1}$$

where N denotes the number of connection pairs in the Ethernet system, a denotes the first coefficient, $cb0_i$ denotes the first postcursor component in the channel tap of the FBE 150, the k denotes the second coefficient, cf3, denotes the last precursor component in the channel tap of the FFE, $cf5_i$ denotes the first postcursor component in the channel taps of the FFE and b denotes the constant. Herein, the first coefficient and the second coefficient are also constants, and N is a positive integer.

Figure 3:
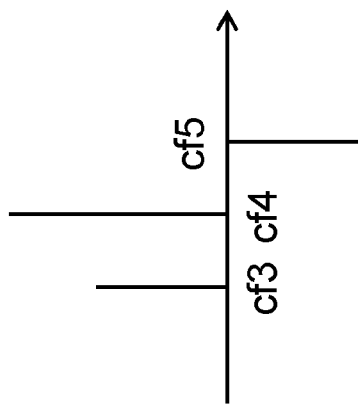
FIG. 3 is a schematic diagram of channel information of a feed-forward equalizer in FIG. 1.

The FFE 130 may perform channel measurement according to the received signal so as to establish a channel tap based on the channel information. The channel tap established by the FFE 130 includes a main tap cf4 and a plurality of secondary taps, as shown in FIG. 3. In the channel tap, the secondary taps occurring before the main tap cf4 are called precursor component cf3, while the secondary taps occurring after the main tap cf4 are called postcursor component cf5.

Figure 4:
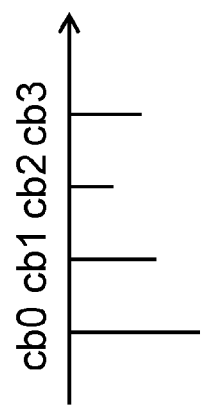
FIG. 4 is a schematic diagram of channel information of a feedback equalizer in FIG. 1.

The FBE 150 also may perform channel measurement according to the received signal so as to establish a channel tap based on the channel information. The channel tap established by the FBE 130 includes a plurality of postcursor components cb0, cb1, cb2 and cb3, as shown in FIG. 4.

In other words, in connection, the channel estimator 180 obtains the last precursor component cf3 and the first postcursor component cf5 in the channel tap established by the FFE 130 and obtains the first postcursor component cb0 in the channel tap established by the FBE 150, and calculates the cable length L according to formula 1 based on the obtained precursor component cf3 and postcursor components cf5 and cb0.

In some embodiments, when the receiver 10 is connected at a transmission rate of 1 Gbps (Giga-bits per second), N may be 1, 2, 3 or 4. When the receiver 10 is connected at a transmission rate of 100 Mbps (Mega-bits per second), N is equal to 1. That is, the cable length L may be calculated only with the number of connection pairs or by averaging calculation results of multiple connection pairs depending on use conditions.

In some embodiments, when the receiver 10 is connected at the transmission rate of 1 Gbps, as the receiver 10 has the echo canceller and NEXT canceller, the FFE 130 and the FBE 150 only encounter channel responses but do not have other interference. At this time, the sampling phase of the receiver 10 changes slightly. In other words, the receiver 10 performs sampling near the best phase each time the receiver 10 is connected, so the precursor component cf3 has little difference. At this time, the channel estimator 180 may estimate the cable length L according to the following formula 2.

$$L = \frac{1}{N}\sum_{i=1}^{N} a \times (cb0_i + cf5_i) + b \quad \text{Formula 2}$$

In addition, in some embodiments, the postcursor components cf5 of the FFE 130 in each channel (connection pair) may be set to be a fixed value. Thus, the channel estimator 180 may estimate the cable length L according to the following formula 3. In other words, when the cable length L is estimated, the channel information of the FFE 130 may not be taken into account.

$$L = \frac{1}{N}\sum_{i=1}^{N} a \times cb0_i + b \quad \text{Formula 3}$$

Alternatively, the channel estimator 180 may estimate the cable length L according to the following formula 4. In other words, when the cable length L is estimated, only the postcursor component cf5 of the FFE 130 is not taken into account.

$$L = \frac{1}{N}\sum_{i=1}^{N} a \times (cb0_i + k \times cf3_i) + b \quad \text{Formula 4}$$

where the first coefficient (a), the second coefficient (k) and the constant (b) are estimated by measuring data when the Ethernet system is constructed. For example, the least square error criterion is used to match the actually measured precursor component cf3 and postcursor components cf5 and cb0 as well as an actual cable length (L) to estimate the first coefficient (a), the second coefficient (k) and the constant (b).

For instance, with respect to the transmission rate of 100 Mbps, the following formula 5 can be obtained by substituting N=1 into Formula 1.

$$L = a \times (cb0 + cf5 + k \times cf3) + b \quad \text{Formula 5}$$

Connection is performed multiple times for different actual cable lengths (L) to actually measure the postcursor components cb0 and cf5 and the precursor component cf3.

k=1.164, a=−181.048498 and b=133.860567 are obtained by substituting the actually measured postcursor components cb0 and cf5 and the precursor component cf3 into Formula 5 and using the least square error criterion.

Figure 5:
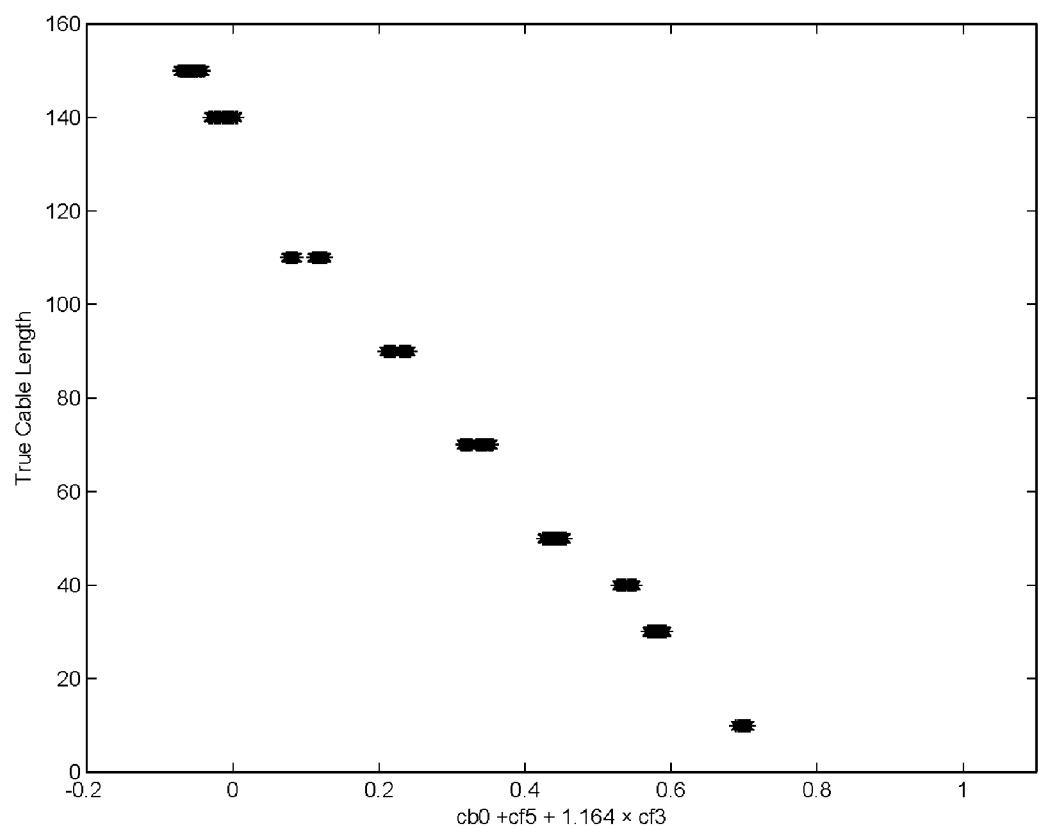
FIG. 5 is a diagram of a relation between linear combination and actual cable lengths of a postcursor component and a precursor component.
Figure 6:
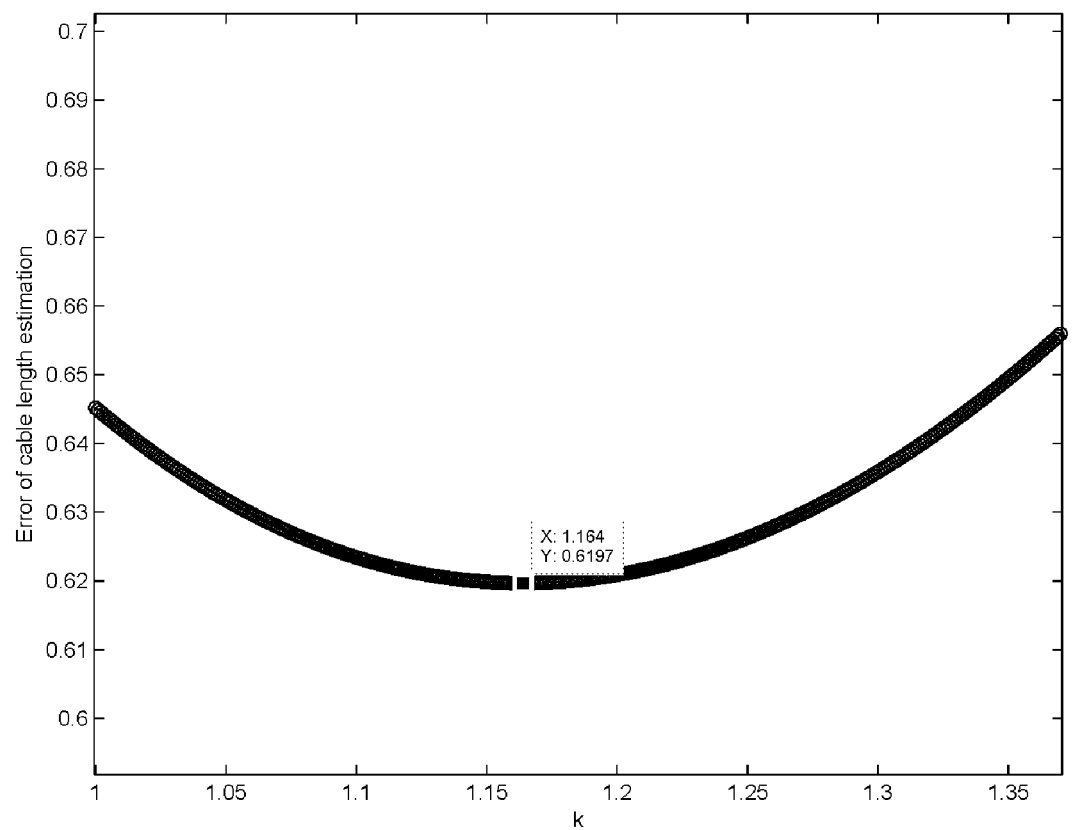
FIG. 6 is a diagram of a relation between a second coefficient and an actual cable length.

Then, it can be found that linear combination (cb0+cf5+ 1.164×cf3) of the postcursor components cb0 and cf5 and the precursor component cf3 has a linear relation with the cable length L, as shown in FIG. 5. Moreover, the least cable length estimation error may occur in the case of k=1.164, as shown in FIG. 6.

With respect to the transmission rate of 1 Gbps, the following formula 6 can be obtained by substituting N=4 into Formula 3.

$$L = \frac{1}{4}\sum_{i=1}^{4} a \times (cb0_i + k \times cf3_i) + b \qquad \text{Formula 6}$$

With respect to each connection channel (connection pair), connection is performed multiple times with different actual cable lengths (L) to actually measure the postcursor component cb0 and the precursor component cf3.

a=−202.357 and b=113.1339 are obtained by substituting the actually measured postcursor component cb0 and the precursor component cf3 into Formula 6 and using the least square error criterion to find the linear relation between cb0 and the cable length.

In sum, the method for estimating cable length in an Ethernet system and the receiver thereof according to the present invention use information of a feedback equalizer (and a feed-forward equalizer) of the receiver in a connection state to obtain channel information corresponding to a channel response (and channel information corresponding to a sampling phase difference), and estimate a cable length accordingly, thereby accurately and easily obtaining cable length information.

Moreover, in the embodiments of the method for estimating cable length in an Ethernet system and the receiver thereof according to the present invention, within the actual cable length of 150 meters, an error within ±3 meters can be achieved during the cable length estimation no matter the transmission rate is 1 Gbps or 100 Mbps.

While the present invention has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A method for estimating a cable length in an Ethernet system, applicable to the Ethernet system, comprising:
   obtaining a channel tap from channel information of a feedback equalizer in the Ethernet system;
   obtaining one or more channel taps from channel information of a feed-forward equalizer in the Ethernet system; and
   performing an averaging operation and a summing operation related to N connection pairs in the Ethernet system according to a product of the obtained channel tap of the feedback equalizer and a first coefficient, according to a product of the obtained channel tap or each of the obtained channel taps of the feed-forward equalizer and at least one of the first coefficient and a second coefficient, and according to a constant to obtain the cable length, wherein N is a positive integer.

2. The method for estimating the cable length in the Ethernet system according to claim 1, wherein the obtained channel tap of the feedback equalizer is a first postcursor component.

3. The method for estimating the cable length in the Ethernet system according to claim 1, wherein the number of the one or more channel taps obtained from the feed-forward equalizer is one, and the step of performing the averaging operation and the summing operation is performed according to the product of the obtained channel tap of the feedback equalizer and the first coefficient, according to the product of the obtained channel tap of the feed-forward equalizer and the first coefficient and according to the constant to obtain the cable length.

4. The method for estimating the cable length in the Ethernet system according to claim 3, wherein the step of performing the averaging operation and the summing operation is performed according to the following formula:

$$L = \frac{1}{N}\sum_{i=1}^{N} a \times (cb0_i + cf5_i) + b,$$

wherein L denotes the cable length, N denotes the number of connection pairs in the Ethernet system, a denotes the first coefficient, $cb0_i$ denotes the obtained channel tap of the feedback equalizer, $cf5_i$ denotes the obtained channel tap of the feed-forward equalizer and b denotes the constant.

5. The method for estimating the cable length in the Ethernet system according to claim 3, wherein the obtained channel tap of the feedback equalizer is a first postcursor component, and the obtained channel tap of the feed-forward equalizer is a first postcursor component.

6. The method for estimating cable length in the Ethernet system according to claim 1, wherein the number of the one or more channel taps obtained from the feed-forward equalizer is one, and the step of performing the averaging operation and the summing operation is performed according to the product of the obtained channel tap of the feedback equalizer and the first coefficient, according to the product of the obtained channel tap of the feed-forward equalizer, the second coefficient and the first coefficient, and according to the constant to obtain the cable length.

7. The method for estimating the cable length in the Ethernet system according to claim 6, wherein the step of performing the averaging operation and the summing operation is performed according to the following formula:

$$L = \frac{1}{N}\sum_{i=1}^{N} a \times (cb0_i + k \times cf3_i) + b,$$

wherein L denotes the cable length, N denotes the number of connection pairs in the Ethernet system, a denotes the first coefficient, $cb0_i$ denotes the obtained channel tap of the feedback equalizer, k denotes the second coefficient, $cf3_i$ denotes the obtained channel tap of the feed-forward equalizer and b denotes the constant.

8. The method for estimating the cable length in the Ethernet system according to claim 6, wherein the obtained channel tap of the feedback equalizer is a first postcursor component, and the obtained channel tap of the feed-forward equalizer is a last precursor component.

9. The method for estimating the cable length in the Ethernet system according to claim 1, wherein the number of the one or more channel taps obtained from the feed-forward equalizer is plural, and the step of performing the averaging operation and the summing operation is performed according to the product of the obtained channel tap of the feedback equalizer and the first coefficient, according to the product of each of a portion of the obtained channel taps of the feed-forward equalizer, the first coefficient and the second coefficient, according to the product of each of the other portion of the obtained channel taps of the feed-forward equalizer and the first coefficient, and according to the constant.

10. The method for estimating the cable length in the Ethernet system according to claim 9, wherein the step of performing the averaging operation and the summing operation is performed according to the following formula:

$$L = \frac{1}{N} \sum_{i=1}^{N} a \times (cb0_i + cf5_i + k \times cf3_i) + b,$$

wherein L denotes the cable length, N denotes the number of connection pairs in the Ethernet system, a denotes the first coefficient, $cb0_i$ denotes the obtained channel tap of the feedback equalizer, k denotes the second coefficient, $cf3_i$ and $cf5_i$ denote the obtained channel taps of the feed-forward equalizer and b denotes the constant.

11. The method for estimating the cable length in the Ethernet system according to claim 9, wherein the obtained channel tap of the feedback equalizer is a first postcursor component, and the obtained channel taps of the feed-forward equalizer are a last precursor component and a first postcursor component.

12. An Ethernet system receiver, comprising:
a front-end receiving device;
a feed-forward equalizer, electrically connected to the front-end receiving device;
an adder, electrically connected to the feed-forward equalizer;
a feedback equalizer, electrically connected to the adder; and
a channel estimator, electrically connected to the feedback equalizer and to the feed-forward equalizer, for performing an averaging operation and a summing operation related to N connection pairs in the Ethernet system according to a product of a channel tap of the feedback equalizer and a first coefficient, according to a product of a channel tap of the feed-forward equalizer and at least one of the first coefficient and a second coefficient, and according to a constant to obtain the cable length, where N is a positive integer.

13. The Ethernet system receiver according to claim 12, wherein the channel tap of the feedback equalizer is a first postcursor component.

14. The Ethernet system receiver according to claim 12, wherein the channel tap of the feedback equalizer is a first postcursor component, and the channel tap of the feed-forward equalizer is a first postcursor component.

15. The Ethernet system receiver according to claim 12, wherein the channel tap of the feedback equalizer is a first postcursor component, and the channel tap of the feed-forward equalizer is a last precursor component.

16. The Ethernet system receiver according to claim 12, wherein the channel estimator performs the averaging operation and the summing operation related to N connection pairs in the Ethernet system according to the product of the channel tap of the feedback equalizer and the first coefficient, according to the product of the channel tap of the feed-forward equalizer and the first coefficient, according to a product of another channel tap of the feed-forward equalizer, the first coefficient and second coefficient, and according to the constant.

17. The Ethernet system receiver according to claim 16, wherein the channel tap of the feedback equalizer is a first postcursor component, the channel tap of the feed-forward equalizer is a first precursor component and the another channel tap of the feed-forward equalizer is a last postcursor component.

18. An Ethernet system receiver, comprising:
a front-end receiving device;
a feed-forward equalizer, electrically connected to the front-end receiving device;
an adder, electrically connected to the feed-forward equalizer;
a feedback equalizer, electrically connected to the adder; and
a channel estimator, electrically connected to the feedback equalizer, for performing an averaging operation and a summing operation related to N connection pairs in the Ethernet system according to a product of a channel tap of the feedback equalizer and a first coefficient and according to a constant to obtain the cable length, where $N \geq 2$.

* * * * *